United States Patent
Gupta

(10) Patent No.: US 7,023,973 B2
(45) Date of Patent: Apr. 4, 2006

(54) DUAL-BAND MODEM AND SERVICE

(75) Inventor: Vinay Gupta, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 334 days.

(21) Appl. No.: 10/425,066

(22) Filed: Apr. 28, 2003

(65) Prior Publication Data

US 2004/0213386 A1 Oct. 28, 2004

(51) Int. Cl.
*H04M 11/00* (2006.01)

(52) U.S. Cl. ............... 379/93.07; 379/93.29; 379/90.01; 375/222

(58) Field of Classification Search ............ 379/93.01, 379/93.05–93.08, 93.26, 93.28–93.34, 90.01; 375/222; 345/744; 715/714; 714/48; 709/229
See application file for complete search history.

(56) References Cited

U.S. PATENT DOCUMENTS

| | | | |
|---|---|---|---|
| 6,002,681 A * | 12/1999 | Bellenger et al. ........... 370/352 |
| 6,192,109 B1 | 2/2001 | Amrany et al. |
| 6,470,046 B1 | 10/2002 | Scott |
| 6,490,295 B1 | 12/2002 | Cooklev et al. |
| 6,515,996 B1 | 2/2003 | Tönnby et al. |
| 6,750,879 B1 * | 6/2004 | Sandberg .................... 715/714 |
| 2002/0018521 A1 * | 2/2002 | Sherlock .................... 375/222 |
| 2002/0054628 A1 * | 5/2002 | Roos et al. ................. 375/222 |
| 2002/0054629 A1 * | 5/2002 | Roos .......................... 375/222 |
| 2002/0057732 A1 * | 5/2002 | Roos .......................... 375/222 |
| 2003/0055992 A1 * | 3/2003 | Miller ........................ 709/229 |
| 2003/0074607 A1 * | 4/2003 | Brundridge et al. .......... 714/48 |
| 2003/0081665 A1 * | 5/2003 | Tokairin ...................... 375/222 |
| 2003/0210704 A1 * | 11/2003 | Tung .......................... 375/222 |
| 2003/0231206 A1 * | 12/2003 | Armstrong .................. 345/744 |

* cited by examiner

*Primary Examiner*—Wing Chan
(74) *Attorney, Agent, or Firm*—Klarquist Sparkman, LLP

(57) ABSTRACT

A communications device, method and service are provided that integrate broadband and dial-up internet access in a seamless service package. A modem is provided that combines both broadband and dial-up connectivity in a single device. The modem includes an auto-sense procedure for switching between the two types of connections. Additionally, a connectivity utility allows a user to interact with a modem that combines both broadband and dial-up connectivity in a single device. The connectivity utility receives various event notifications from the modem and provides the user with the ability to receive off or on-line help, current modem or connection status, the status of an order for service, control of modem parameters, billing information, and other features.

48 Claims, 8 Drawing Sheets

DUAL-BAND MODEM AND SERVICE

TECHNICAL FIELD

The present invention relates to communications devices, and particularly, to a modem that connects both to dial-up service and broadband service and the software and firmware for controlling the modem.

BACKGROUND

Users of the modern day internet must often decide between a higher speed internet option (high speed) such as DSL or cable connections and give-up their dial-up capability, or they must continue to use a dial-up connection and suffer through slow connection speeds.

A user who wishes to have a high speed connection available, such as DSL, encounters numerous sources of frustration. For example, assume a user has contacted a high speed connection provider and expressed a desire to have a home DSL connection. The first step the provider will take is contacting the phone company to have the line physically enabled for a DSL connection. This process can take between 2–6 weeks. During this lag time, the provider has the option of sending the user a DSL modem the user is unable to use during the lag time, or they can choose to wait and send it when they receive confirmation from the phone company that the line is enabled. If the user received dial-up service prior to ordering a high speed connection, they will be able to connect with it for the lag time. If the user did not previously have dial-up, they must purchase a modem and dial-up service if they wish to be connected instantly, or they must go without a connection until the DSL service is enabled and modem installed.

Additionally, once the line is enabled for DSL service there can be interruptions in service. This leaves the user without any method for establishing a connection because most likely the user has given up any previous dial-up capability once the DSL connectivity was enabled.

SUMMARY

A communications device, method and service are provided that integrate broadband and dial-up internet access in a seamless service package. For the purpose of this application, broadband will refer to any method or system for connecting one device to another operable to send data at a rate greater than 56 kilobytes per second. Thus, broadband includes but is not limited to connections such as Cable, Digital Subscriber Line (DSL), Satellite, Integrated Service Digital Network (ISDN), T lines (T1, T3, etc.), and wireless systems (Wi-Fi).

In one aspect, a dual-band modem is provided that combines both broadband and dial-up connectivity in a single device. The device may provide two separate chipsets, one for dial-up connectivity and another for a broadband connectivity. Alternatively, one chipset can be provided to provide connectivity for both the broadband and dial-up connections.

In another aspect, firmware and software drivers are provided that control the operations of a dual-band modem. The firmware and software drivers implement an auto-sense procedure for detecting when either of a dial-up or broadband connection is available and when to switch between the two types of connections.

In another aspect, a connectivity utility allows a user to interact with a modem that combines both broadband and dial-up connectivity in a single device. The connectivity utility receives various event notifications from the modem and provides the user with the ability to receive off or on-line help, current modem or connection status, the status of an order for service, control of modem parameters, billing information, and other features.

These and other aspects will become apparent from the following detailed description, which makes references to the accompanying drawings.

DETAILED DESCRIPTION

Figure 1:
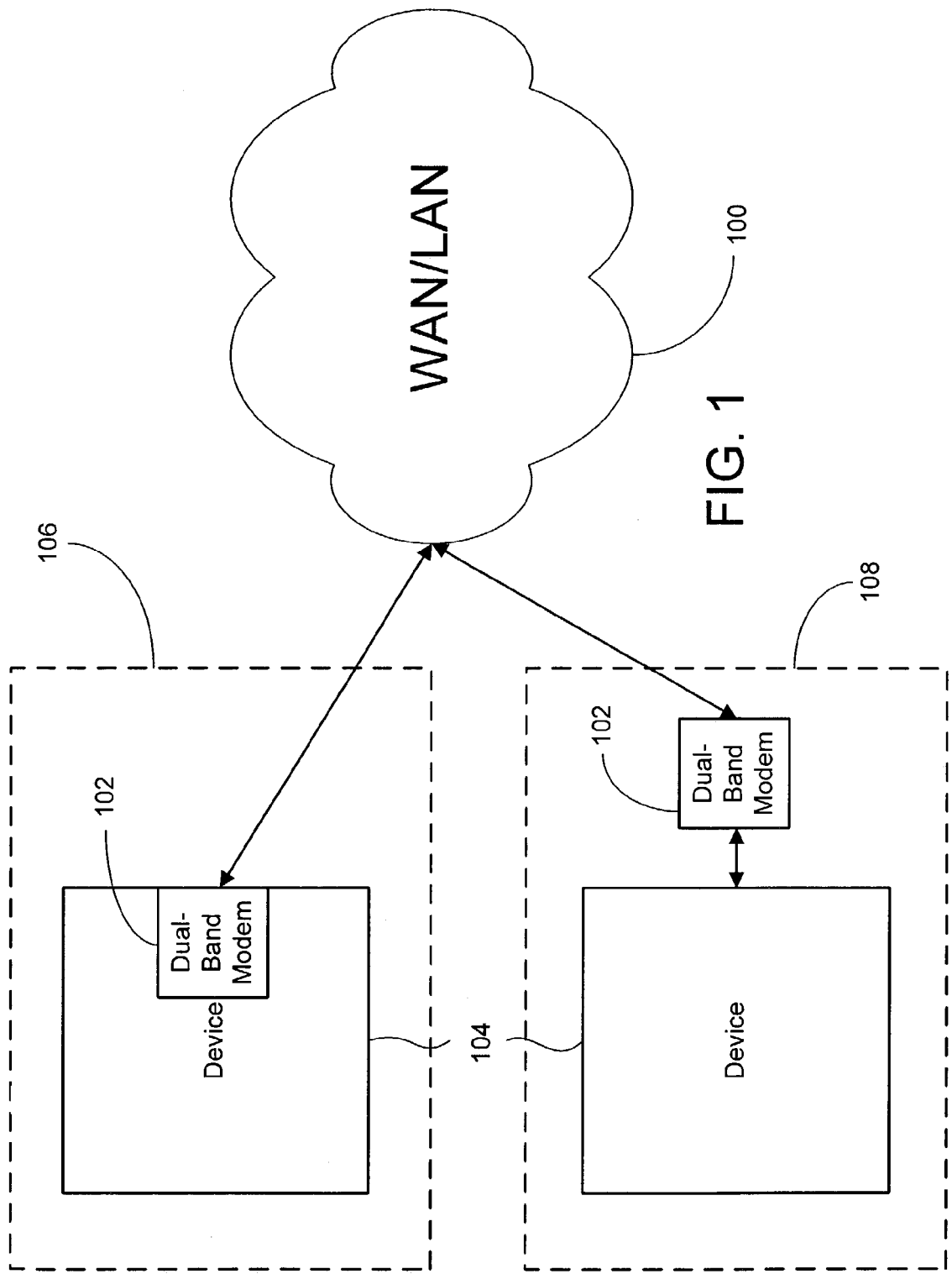
FIG. 1 is a diagram of a device connected to either a Local Area Network (LAN) or Wide Area Network (WAN) using a dual-band modem.

FIG. 1 shows a device connected to either a Local Area Network (LAN) or Wide Area Network (WAN) 100 using a dual-band modem 102. The device 104 can be a personal computer, or any other device, such as a game console, television set top box, etc., that could benefit from a connection to a network. The modem 102 has the ability to establish a broadband connection or dial-up connection to the LAN/WAN 100. The broadband connection can be any of a number of broadband options, such as Cable, Digital Subscriber Line (DSL), Satellite, Integrated Service Digital Network (ISDN), T lines (T1, T3, etc.), and wireless systems (Wi-Fi). As shown in FIG. 1, the modem 102 can be either internal to the device as shown at 106 or can be external to the device as shown at 108.

Figure 2:
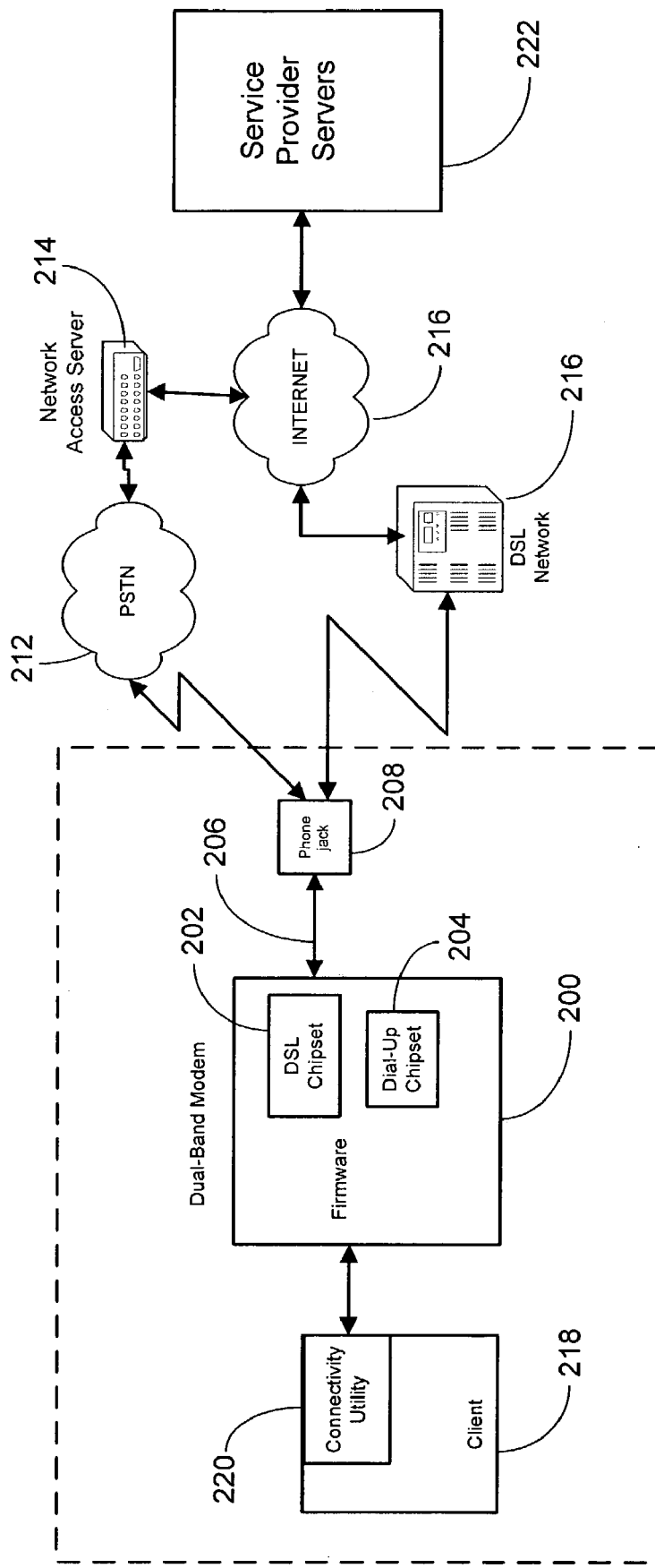
FIG. 2 is a block diagram of one embodiment of a dual-band modem and service for providing both broadband and dial-up connectivity to a user.
Figure 3A:
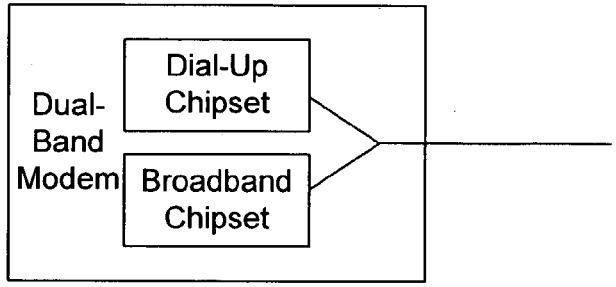
FIG. 3 is a diagram of four possible variations of chipsets and supplied data lines are demonstrated.
Figure 3B:
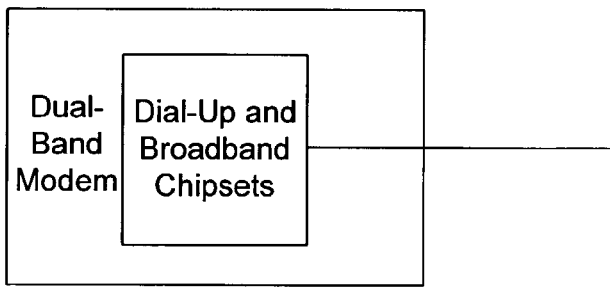
Figure 3C:
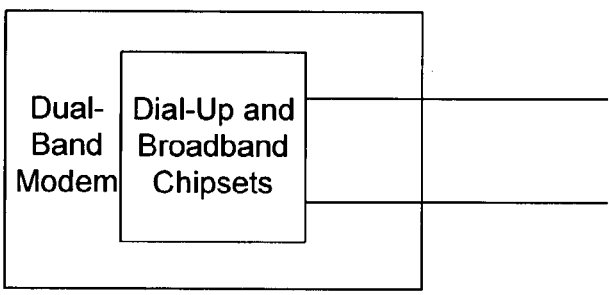
Figure 3D:
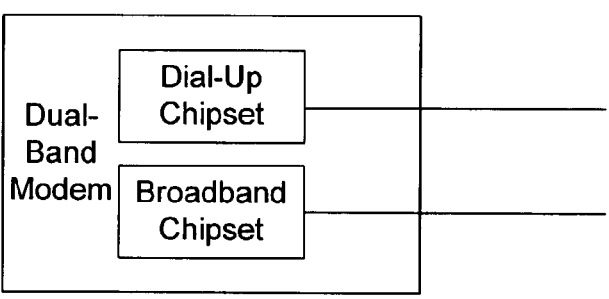

FIG. 2 is a block diagram of one embodiment of a dual-band modem and service for providing both broadband and dial-up connectivity to a user. For purposes of this embodiment, the broadband option used is DSL. The dual-band modem 200 comprises a DSL chipset 202 and a dial-up chipset 204, and is connected to a single data line 206 supplied from phone jack 208. This is only one embodiment of the chipset and supplied data line. Some possible configurations of chipsets and supplied data lines will be discussed in more detail with respect to FIG. 3. The dual-band modem is also connected to a client 218, either externally or internally as described with respect to FIG. 1. The client 218 contains a Connectivity utility 220 that is in communication with the dual-band modem 200. Features of the Connectivity utility 220 will be explained in more detail with respect to FIGS. 5 and 6. The phone jack 208 is connected to both a Digital Subscriber Line Access Manager 210 (DSLAM) and to a Public Switch Telephone Network 212 (PSTN). The DSLAM 210 then provides a DSL connection to the various servers that make up the internet 216 (or LAN). The PSTN 212, through a Network Access Server (NAS) 214, provides a dial-up connection to the various servers that make up the internet 216 (or LAN). Through the internet, the client can access any number of servers, such as servers of the Service Provider(s) 222.

FIG. 3 shows four possible variations of chipsets and supplied data lines. FIG. 3(a) shows the configuration of FIG. 2 wherein one line is supplied to two chipsets. This may be a possible configuration for DSL using separate chipsets. Only a single data line need be supplied because a DSL connection is established over the same telephone line as a dial-up connection. FIG. 3(b) shows a single chipset and a single supplied data line. This may be a possible configuration for DSL using a single chipset which combines the necessary components for both DSL and dial-up connectivity. FIG. 3(c) shows one chipset with two supplied data lines. This may be a possible configuration for a Cable connection using a single chipset which combines the necessary components for both Cable and dial-up connectivity. Two data lines are supplied because a Cable connection requires a separate data line from a dial-up connection. Likewise, FIG. 3(d) shows two separate chipsets and two supplied data lines, for a configuration using two separate chipsets for Cable and dial-up connectivity.

The dual-functionality of a dual-band modem can be controlled by the use of firmware and drivers. A driver is a term used for software that allows an operating system on a client computer, such as Microsoft Windows, to communicate with a device connected to the computer, such as a modem, graphics card, network adaptor, or other peripheral. Firmware generally refers to software instructions that are permanently or semi-permanently written to a hardware component of one of the devices that are in communication with the drivers installed into an operating system.

Figure 4:
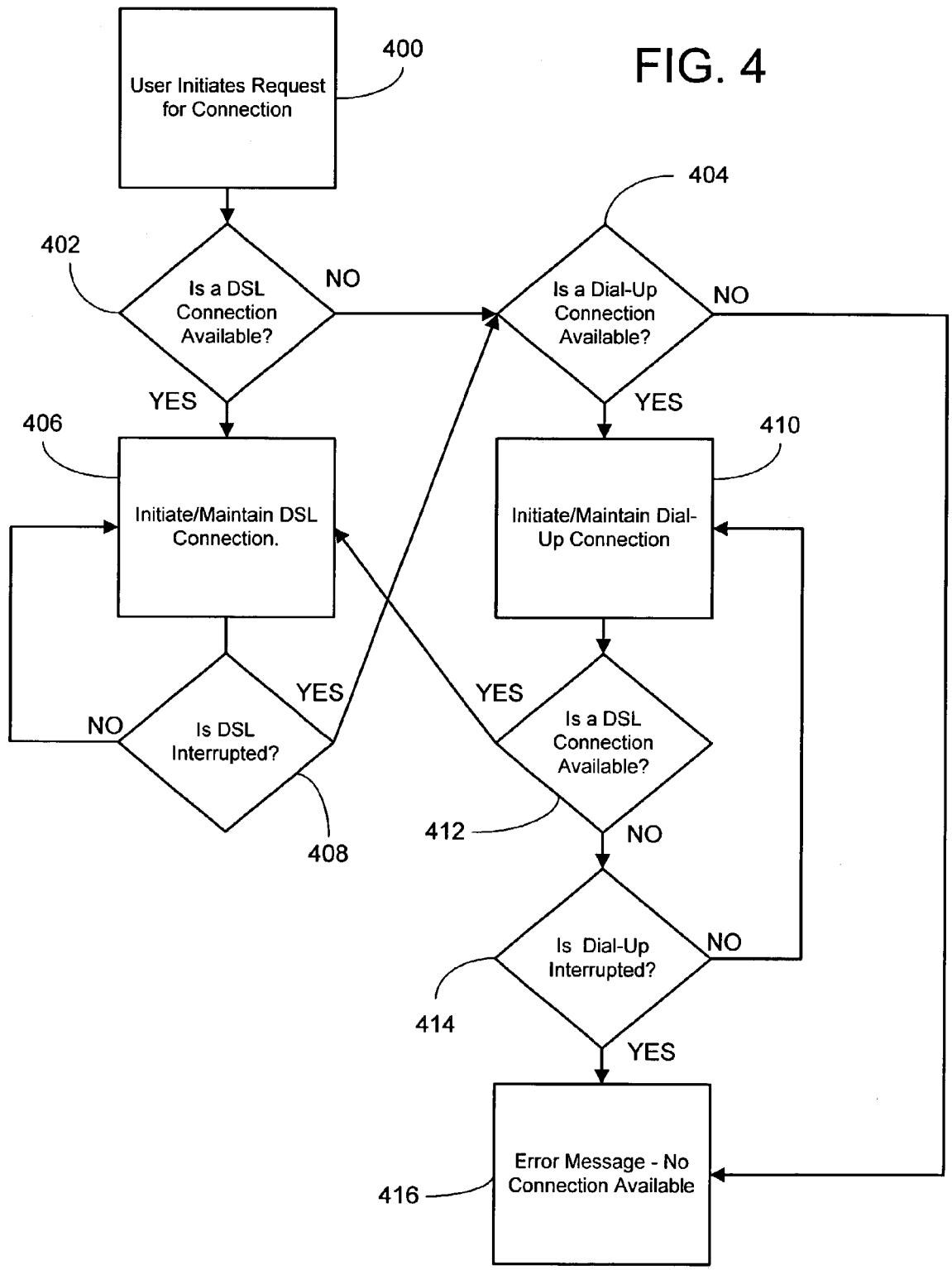
FIG. 4 is a flowchart of a possible flowchart for controlling a dual-band modem.

In one embodiment, a dual-band modem is controlled by a procedure implemented in firmware and drivers to control a line driver that switches back and forth between a DSL connection and dial-up connection. FIG. 4 shows a flowchart of a possible flowchart for controlling a dual-band modem. In block 400 a user of a dual-band modem requests a connection to another device. Decision block 402 determines if a DSL connection is available. If no DSL connection is available, decision 404 is processed to determine if a dial-up connection is available. If a DSL connection is available, block 406 is processed to establish and maintain a DSL connection. Decision block 408 determines if the DSL connection is interrupted. If no interruption exists, block 406 is processed to re-establish or maintain the DSL connection. If an interruption exists, decision block 404 is processed to determine if a dial-up connection is available. If no dial-up connection is available, block 416 is processed to conclude that no connection is available. If a dial-up connection is available, block 410 is processed to establish and maintain a dial-up connection. Decision block 412 determines if a DSL connection is now available. If a DSL connection is now available, block 406 is processed to establish and maintain a DSL connection. If no DSL connection is available, decision block 414 is processed to determine if the dial-up connection is interrupted. If no interruption exists, block 410 is processed to re-establish or maintain the dial-up connection. If an interruption exists, block 416 is processed to conclude that no connection is available.

One of skill in the art will recognize that the procedure shown in FIG. 4 may be modified without altering the purpose of the procedure. For instance, decision block 412 and 414 could be processed in reverse order. Additionally, the procedure could be implemented without checking for a connection before establishing the connection. Rather, the procedure could simply attempt to initiate a DSL connection, and upon failing, attempt a dial-up connection.

The procedure can determine when to check for the availability of a connection in a number of ways. For instance in one embodiment, decision block 412, which checks for a DSL connection while maintaining a dial-up connection, can be processed at regular time intervals. The power to the chipset, or portion of the chipset, responsible for establishing a DSL connection can either be powered off or left on during the intervals when the availability of a DSL connection is not being checked. Alternatively, the chipset, or portion of a chipset, responsible for establishing a DSL connection can be constantly on and constantly checking for availability of a connection.

In other embodiments, an indication can be sent from an outside source, such as the connectivity utility, a user, or a Service Provider server, to indicate that the availability of a connection should be checked or a connection is currently available. For instance, the user could specify when they want to check for a DSL connection when a dial-up connection is being maintained. Alternatively, an indication could be sent from a DSLAM or a Service Provider server when a DSL connection is available.

Also, when the procedure checks for the availability of a connection can be decided upon and specified by the user, or can be dependant on the service being in a pre-activation or post-activation state. In one embodiment, the user can specify whether the availability of a DSL connection is checked for at timed intervals, constantly, or when an indication is received that the DSL connection is available. Alternatively, the availability of a DSL connection can be checked with one method, such as at one day intervals, when the user is in a pre-activation state, i.e. waiting to have their phone line enabled for DSL by a phone company immediately after a service order. Subsequently, the availability of a DSL connection can be checked with second method, such as when an indication is received, when the user is in a post-activation state, i.e. their phone line has already been enabled for DSL by a phone company.

In addition, how the procedure determines if a connection is available can vary. In one embodiment, the availability of a connection can be tested by line sense. In other words, a DSL connection can be detected by checking for a carrier tone and a dial-up connection can be detected by checking for a dial tone. Alternatively, the connections can be checked by sending and receiving a test message or by simply attempting to establish a connection.

Figure 5:
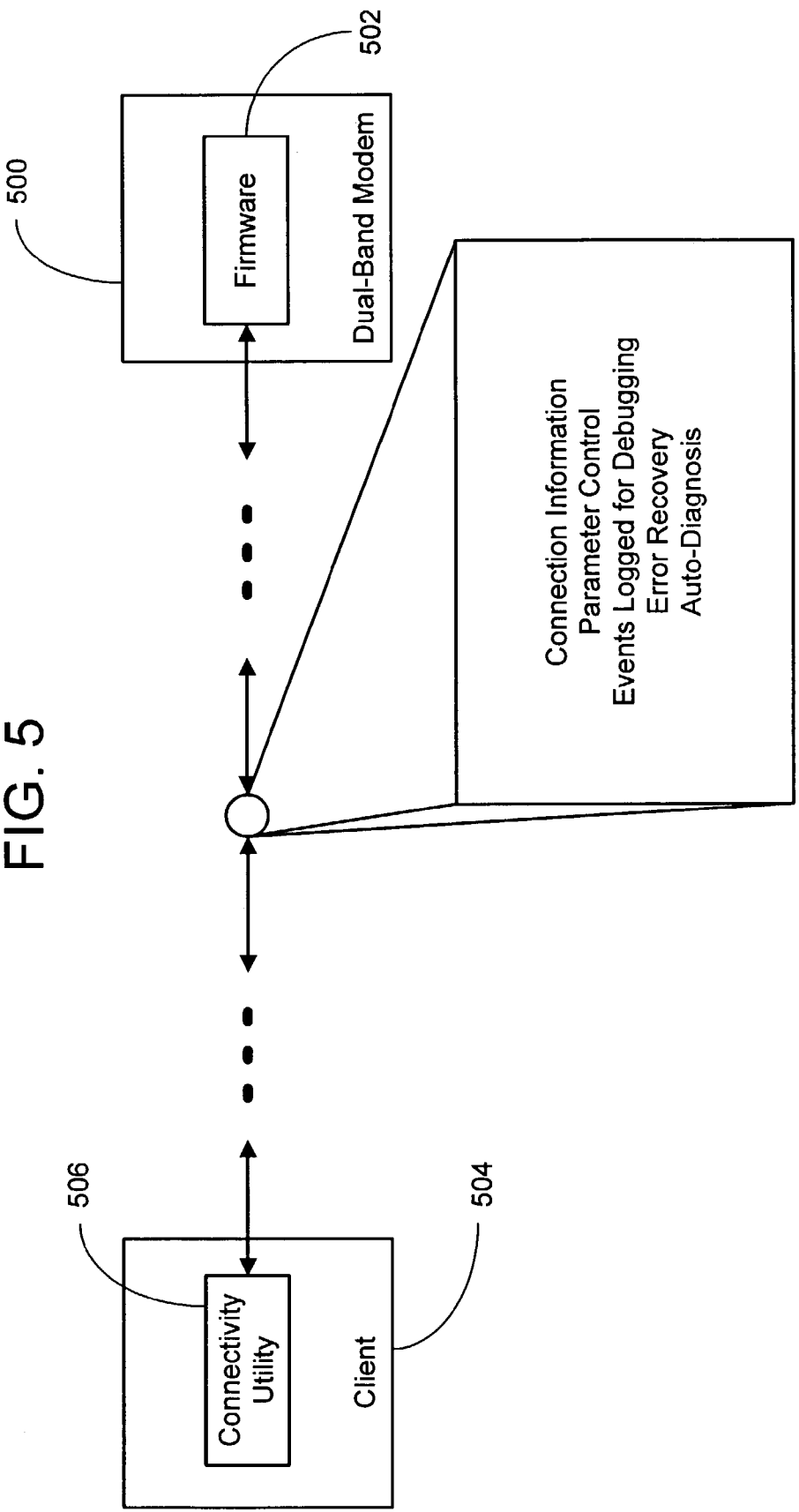
FIG. 5 is a block diagram of communication between a dual-band modem and a connectivity utility on client.

Numerous features of a dual-band modem can be exposed by a connectivity utility. FIG. 5 is a block diagram of communication between a dual-band modem 500 and connectivity utility 506. This communication can be implemented in a number of different ways. In one embodiment, the dual-band modem 500 is controlled by firmware, the firmware being in communication with software drivers, the software drivers communicating with an operating system, the operating system being in communication with an application programming interface (API), and the API being in communication with connectivity utility 506. However, those of skill in the art will appreciate that there are a number of well known methods in the art for establishing such communication.

In one embodiment, the dual-band modem 500 contains firmware 502 for controlling the operations of dual band modem 500. Connectivity utility 506 sends messages to control certain aspects of dual-band modem 500 through firmware 502, and firmware 502 also notifies connectivity utility 506 of various events that occur with respect to dual-band modem 500. For example, various information that might be exchanged between dual-band modem 500 and connectivity utility 506 is listed in FIG. 5.

In one embodiment, connection information can be exchanged between the dual-band modem 500 and connectivity utility 506 and displayed or recorded for the user by connectivity utility 506. This information may consist of whether a connection is established, which type of connection is established (i.e. DSL or dial-up), speed of connection, length of time the connection has been established, etc. Parameter control can also be communicated between the dual-band modem 500 and connectivity utility 506. Connectivity utility 506 can display a series of options for controlling dual-band modem 500 for the user to select in a graphical user interface (GUI) and then notifies dual-band modem 500 of the selected options. These options can include whether or not to notify the user before switching connection types, whether or not to notify the user before disconnecting a connection, whether to automatically connect when an application prompts for a connection, whether or not to allow the user to select dial-up access numbers or to have them selected automatically, etc.

Additionally, events from the dual-band modem 500 can be logged by the connectivity utility 506 for debugging purposes. For instance, the events can be as high level as a time and cause of a disconnection or connection, or lower level events such as a sequence or occurrence of individual modem commands. Once logged, these events can be used by connectivity utility 506, a user, application, or other entity to aid in fixing bugs in firmware, drivers, etc. For instance, the events can be recorded in a file and transmitted back to the developer of the dual-band modem 500 and connectivity utility 506 such that bugs in their operation can be detected and corrected. Alternatively, the events can be recorded by connectivity utility 506 and made available to a help technician when contacted by the user for assistance in fixing a problem with the operation of dual-band modem 500.

Error recovery information can also be sent or received between dual-band modem 500 and connectivity utility 506. For instance, if a connection is lost while the user is viewing a particular web page or running a particular application, connectivity utility 506 can save information related to the application or web page such that the connectivity utility 506 can prompt the user upon reconnection if they desire to reconnect to the web page previously being viewed or restart the application previously being used. If so, connectivity utility 506 can restart the program or start a browser application to reconnect to the web page.

Likewise, the dual-band modem 500 can communicate auto-diagnosis information to connectivity utility 506 for use with an auto-diagnosis feature wherein problems with dual-band modem 500 can be diagnosed and corrected automatically by connectivity utility 506 or another application without intervention of the user. For instance, connectivity utility 506 can alter predefined parameters to fix a fairly common problem with dual-band modem 500 in response to receiving auto-diagnostic information indicative of the problem. Alternatively, an application can be provided on a server computer to implement the same functionality. In another embodiment, the auto-diagnostic information can be recorded by connectivity utility 506 and made available to a help technician when contacted by the user for assistance in fixing a problem.

Figure 6:
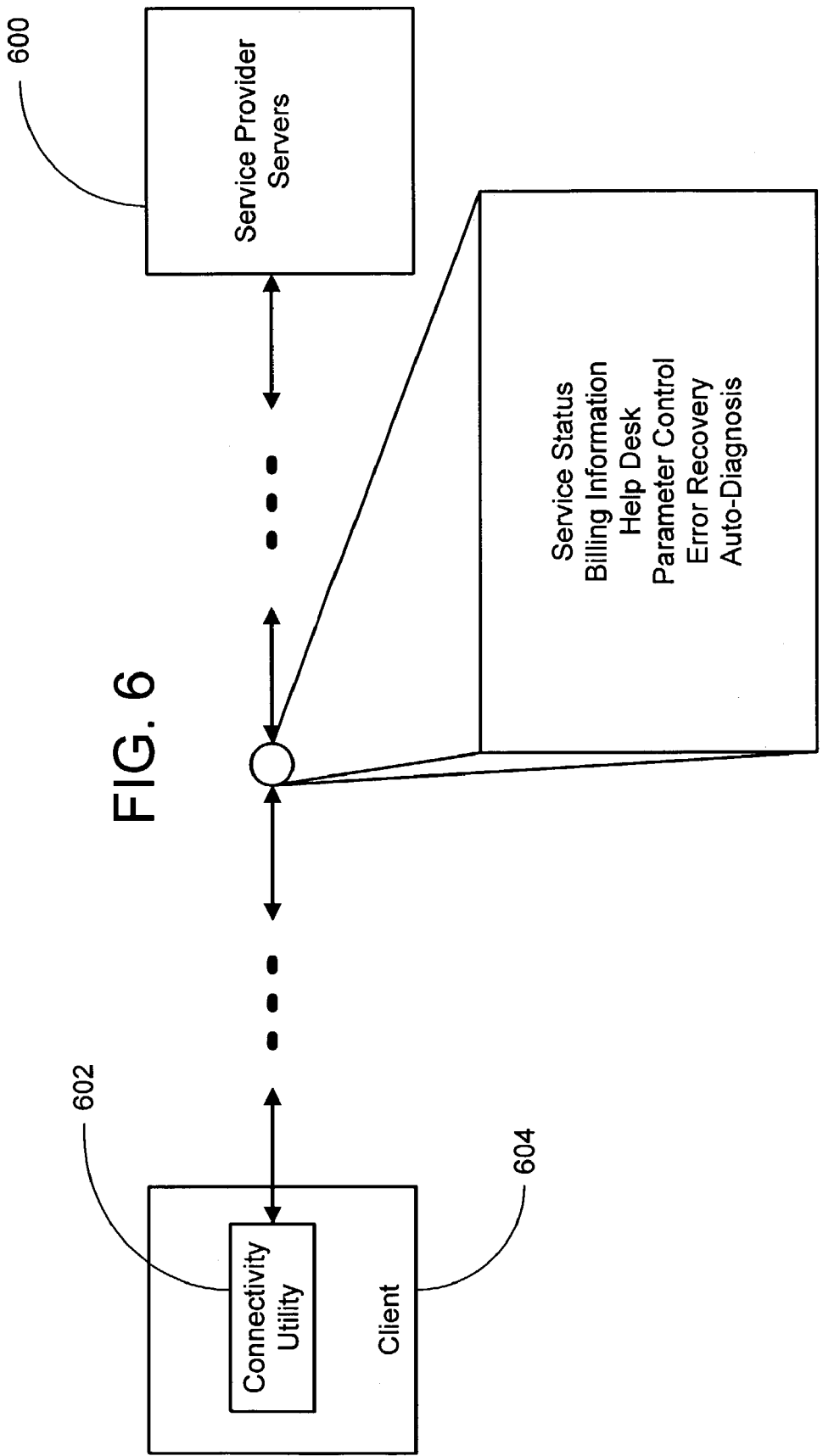
FIG. 6 is a block diagram of communication between a Service Provider server and a connectivity utility on client.

Connectivity utility 506 also exposes numerous feature of a dual-band modem that utilize a Service Provider server. FIG. 6 is a block diagram of communication between a Service Provider server 600 and connectivity utility 602. This communication can be implemented in a number of different ways. In one embodiment, the Service Provider server 600 is in communication with connectivity utility 602 through a DSL or dial-up connection as shown in FIG. 2. However, those of skill in the art will appreciate that there are a number of well known methods in the art for establishing such communication.

In one embodiment, the Service Provider server 600 and connectivity utility 602 are in communication to exchange various types of information. FIG. 6 lists possible examples of information that might be exchanged between Service Provider server 600 and connectivity utility 602.

One possible type of information that can be exchanged between Service Provider server 600 and connectivity utility 602 is service status information. For instance, the service status information can comprise when a phone company is scheduled to enable a user's line for a DSL connection, when the DSL connection is scheduled to be available, if a dual-band modem has been dispatched to the user and when it should arrive, conditions of service such as how many hours of connection time the user has available, when DSL service will be available after an interruption in service, a hyperlink to a Uniform Address Locator (URL) where information about the Service Provider is given, etc.

Billing information may also be exchanged between Service Provider server 600 and connectivity utility 602. For example, billing information can comprise how much the user is being charged for service, what the user currently owes, a hyperlink to a URL where instructions can be found on how to make payment, a hyperlink to a URL where payment can be made electronically, if a payment has been received, etc.

Connectivity utility 602 can be responsible for displaying both the service status information and billing information to the user or store it for subsequent use. Additionally, connectivity utility 602 can either display the information itself, or call upon another application to do so. For instance, the billing information can be viewed from within the connectivity utility 602, or the connectivity utility 602 can direct another application, such as Microsoft® Money, to edit or display the billing information.

The connectivity utility 602 can also allow the user to send and receive help desk information. In one embodiment, the user can use a GUI provided by connectivity utility 602 to send an indication that the user is having difficulty with their service or dual-band modem to the Service Provider server. In response, the user can be contacted by the Service Provider via telephone, email, text messaging, etc. in an attempt to solve the problem. Additionally, the user could use the GUI provided by the connectivity utility 602 to send an email or text message to the Service Provider describing the problems encountered. Connectivity utility 602 can also provide the user with information for attempting to solve the problem without contacting the Service Provider. Such information might include Frequently Asked Questions (FAQ), a searchable database, a hyperlink to a URL with help desk information, etc.

The Service Provider server 600 can also communicate with connectivity utility 602 to remotely adjust parameters pertaining to a dual-band modem or service. These parameters can be adjusted in order to set up a newly installed dual-band modem for service, to increase performance, to solve problems encountered by the user or to simply alter functionality such as whether the user needs to approve a change in connection type, whether the user must select access parameters (such as COM ports, baud rate, access numbers, etc.), or whether they should be set by connectivity utility 602 or the Service Provider.

Connectivity utility 602 can also communicate with a Service Provider server 600 to assist in the auto-diagnosis and debugging features described in reference to FIG. 5. Connectivity utility 602 can transmit the auto-diagnosis or debugging information provided by the dual-band modem to a Service Provider server such that the Service Provider, or an application provided by the Service Provider, can send instructions back to connectivity utility 602 to display to the user for solving a problem, or the instructions can direct connectivity utility 602 to alter parameters pertaining to the dual-band modem to solve the problem. In another embodiment, the auto-diagnostic or debugging information transmitted is made available to a help technician for assistance in fixing a problem with the operation of a dual-band modem or service. Connectivity utility 602 can also provide the Service Provider server with pertinent information, such as when a service is unavailable, how many hours the user spends online, if the activation of a line is later than an expected date or time, statistics related to the activity of the user on the internet, etc.

Figure 7:
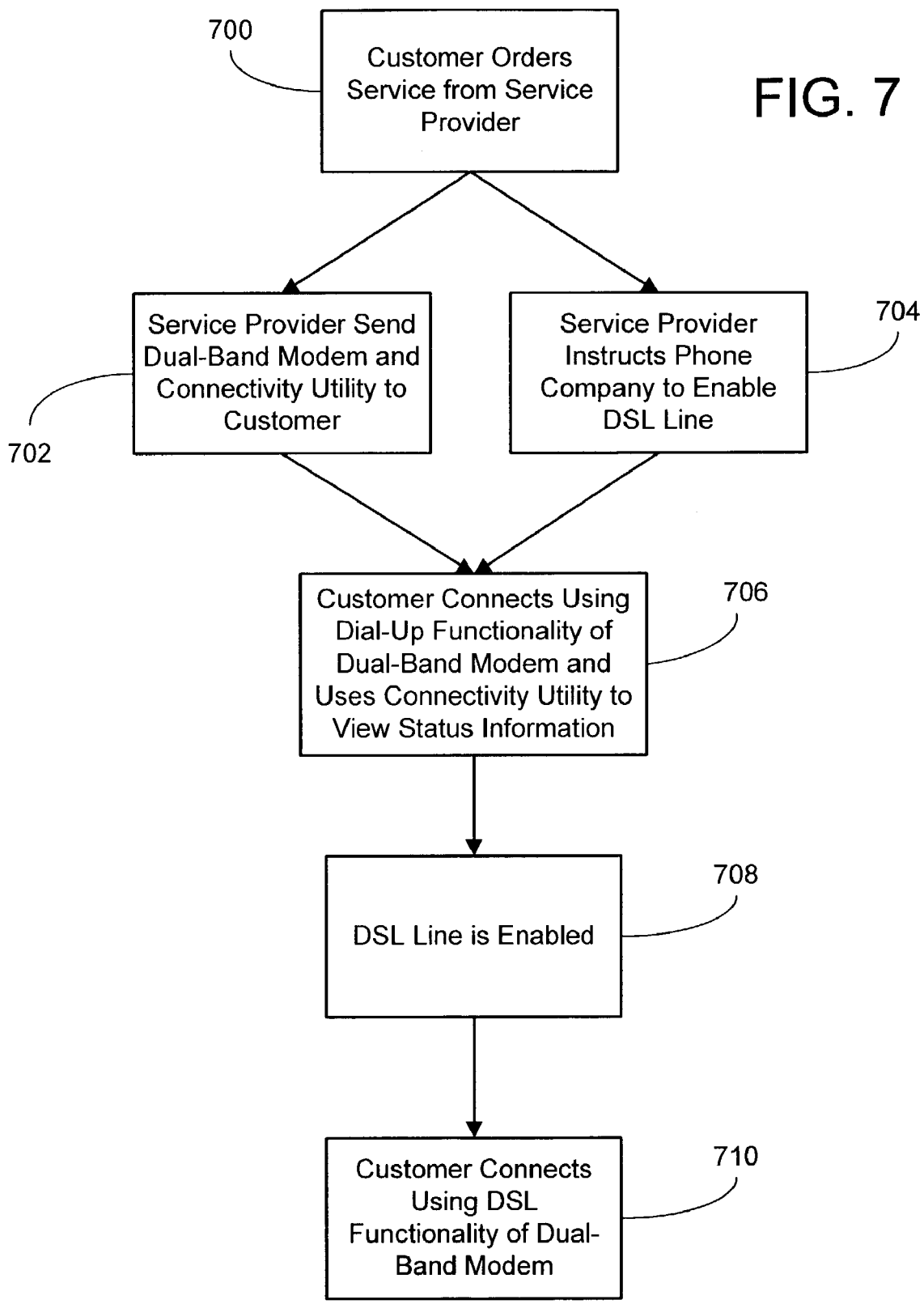
FIG. 7 is a flow chart showing one embodiment of a business method for providing DSL service to a customer.

The features of a dual-band modem allow a Service Provider to offer a customer who desires a high-speed internet connection immediate access to the internet. It also allows the Service Provider to immediately send out a dual-band modem to be installed and used as soon as the user receives it. For instance, FIG. 7 is a flow chart showing one embodiment of a business method for providing DSL service to a customer.

At block 700, a customer contacts a Service Provider and requests DSL service for their home or business. At this point, the Service Provider can immediately send out a dual-band modem and connectivity utility in a single package as shown in block 702 and instruct a phone company to begin the necessary steps to enable a DSL line for the customer in block 704. Alternatively, the modem can be packaged separately and the customer can be instructed to download a connectivity utility once a connection is established. Once the customer receives a dual-band modem, block 706 shows that the customer can utilize the dial-up functionality of the dual-band modem until the phone company enables the line for DSL. The connectivity utility keeps the customer apprised of their order status and when they can expect DSL service to be available. Once the line is enabled for DSL as shown in block 708, the customer can then begin using the DSL functionality of the dual-band modem.

Thus, a dual-band modem and service eliminates the need for the Service Provider to either send a modem to a customer and the customer having to wait until the line is enabled for DSL to connect to the internet, or the Service Provider having to delay sending the modem until the line is enabled for DSL. Instead, the Service Provider can immediately send a dual-band modem when the customer requests service and the customer can make use of the modem immediately upon receiving it. Additionally, a connectivity utility can be sent concurrently, or downloaded, with the modem to keep the customer apprised of the status of their order and when they can expect DSL service to be enabled.

Figure 8:
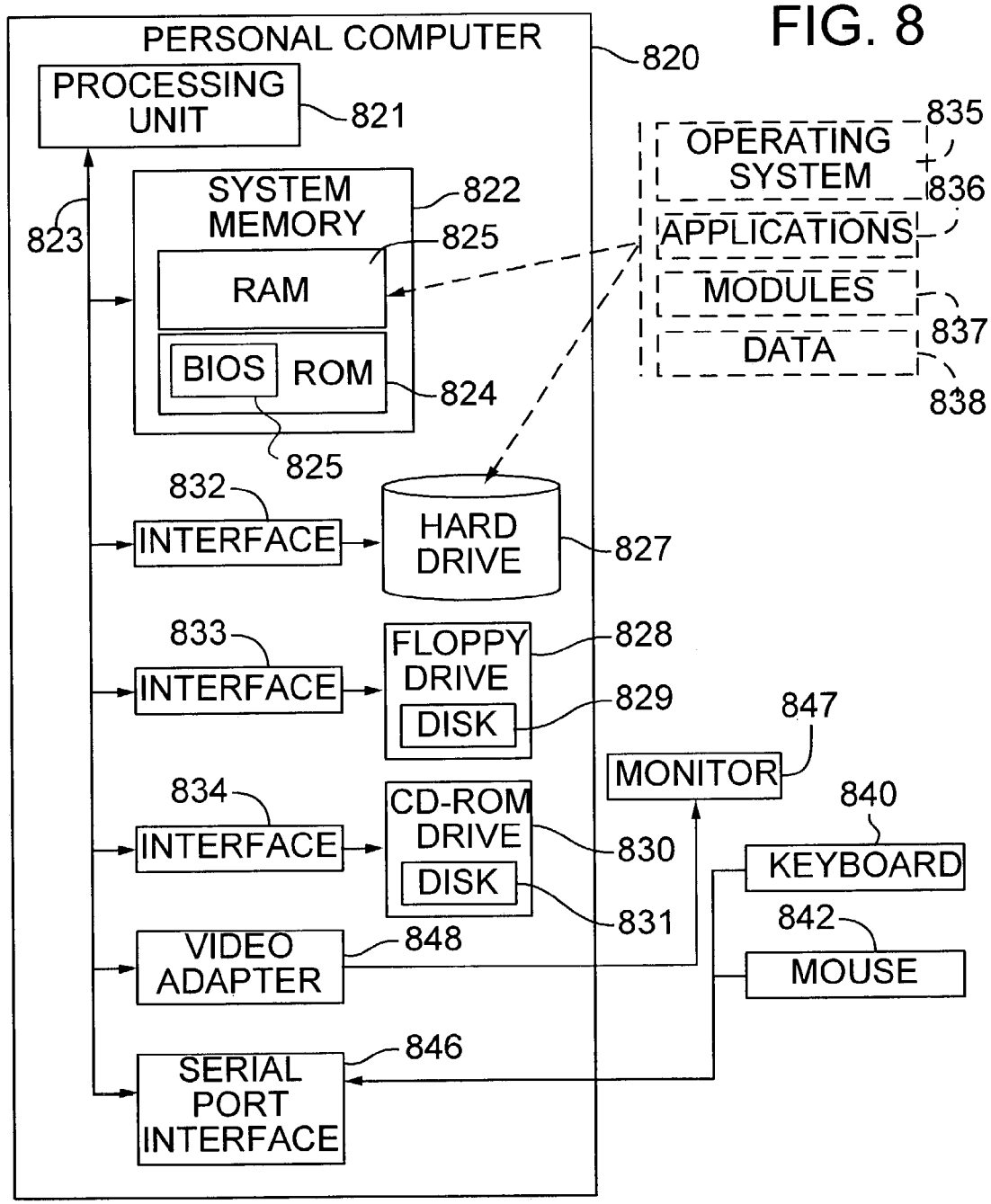
FIG. 8 is a block diagram of a computer system that serves as an operating environment for implementing a dual-band modem.

FIG. 8 illustrates an example of a computer system that serves as an operating environment for an embodiment of a dual-band modem. The computer system includes a personal computer 820, including a processing unit 821, a system memory 822, and a system bus 823 that interconnects various system components including the system memory to the processing unit 821. The system bus may comprise any of several types of bus structures including a memory bus or memory controller, a peripheral bus, and a local bus using a bus architecture such as PCI, VESA, Microchannel (MCA), ISA and EISA, to name a few. The system memory includes read only memory (ROM) 824 and random access memory (RAM) 825. A basic input/output system 826 (BIOS), containing the basic routines that help to transfer information between elements within the personal computer 820, such as during start-up, is stored in ROM 824. The personal computer 820 further includes a hard disk drive 827, a magnetic disk drive 828, e.g., to read from or write to a removable disk 829, and an optical disk drive 830, e.g., for reading a CD-ROM disk 831 or to read from or write to other optical media. The hard disk drive 827, magnetic disk drive 828, and optical disk drive 830 are connected to the system bus 825 by a hard disk drive interface 832, a magnetic disk drive interface 833, and an optical drive interface 834, respectively. The drives and their associated computer-readable media provide nonvolatile storage of data, data structures, computer-executable instructions (program code such as dynamic link libraries, and executable files), etc. for the personal computer 820. Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 825, including an operating system 835, one or more application programs 836, other program modules 837, and program data 838. A user may enter commands and information into the personal computer 820 through a keyboard 840 and pointing device, such as a mouse 842. Other input devices (not shown) may include a microphone, joystick, game pad, satellite dish, scanner, or the like. These and other input devices are often connected to the processing unit 821 through a serial port interface 846 that is coupled to the system bus, but may be connected by other interfaces, such as a parallel port, game port or a universal serial bus (USB). A monitor 847 or other type of display device is also connected to the system bus 823 via an interface, such as a display controller or video adapter 848. In addition to the monitor, personal computers typically include other peripheral output devices (not shown), such as speakers and printers.

Having illustrated and described the principles of the illustrated embodiments, it will be apparent to those skilled in the art that the embodiments can be modified in arrangement and detail without departing from such principles.

For example, although the illustrated embodiments describe a dual-band modem connected to a computer, the claimed invention is not so limited. The features described could be implemented on any device that could benefit from a connection to another device, such as a game console, television set top box, media server, etc.

Additionally, the illustrated embodiments reference types of communication, and types of information communicated, between the client (and connectivity utility therein) and a dual-band modem or Service Provider server. However, such types of communication and types of information communicated are easily implemented between the dual-band modem and Service Provider server, or any other server.

In view of the many possible embodiments, it will be recognized that the illustrated embodiments include only examples and should not be taken as a limitation on the scope of the invention. Rather, the invention is defined by the following claims. We therefore claim as the invention all such embodiments that come within the scope of these claims.

I claim:

1. A unitary communications component for use in a computing device to establish a data connection between the computing device and a second device, the communications component comprising:
   components operable to establish and maintain an analog connection between the computing device and second device; and
   components operable to establish and maintain a digital connection between the computing device and second device, and wherein the communications component is configurable to interact with a software device that provides notifications to the computing device related to changes in a connection status.

2. The communications component of claim 1 wherein the analog connection is a dial-up connection.

3. The communications component of claim 1 wherein the digital connection is a broadband connection.

4. The communications component of claim 1 wherein the components operable to maintain an analog connection comprise a dial-up chipset.

5. The communications component of claim 1 wherein the components operable to maintain an analog connection comprise an analog modem.

6. The communications component of claim 1 wherein the components operable to maintain a digital connection comprise of a DSL chipset.

7. The communications component of claim 1 wherein the components operable to maintain a digital connection comprise a Digital Signal Line Transceiver.

8. The communications component of claim 1 wherein the components operable to establish and maintain a digital connection and the components operable to establish and maintain an analog connection comprise two separate chipsets within the communications component.

9. The communications component of claim 1 wherein the components operable to establish and maintain a digital connection and the components operable to establish and maintain an analog connection comprise a single chipset within the communications component.

10. The communications component of claim 1 further comprising a procedure for determining when a connection is available.

11. The communications component of claim 1 wherein both the digital connection and analog connection are maintained through a single line.

12. The communications component of claim 1 wherein the digital connection is maintained through a first line and the analog connection is maintained through a second line.

13. The communications component of claim 1 wherein the computing device is a personal computer and the second device is a server computer.

14. The communications component of claim 1, wherein the notifications comprise an indication that the communications component is about to discontinue the analog or digital connection and establish the digital or analog connection.

15. The communications component of claim 1, wherein the notifications comprise an indication that the communications component will disconnect a connection.

16. A system for connecting a first device to a second device comprising:
   a communications device to establish and maintain at least an analog and digital connection between the first and second devices; and
   a connectivity utility in communication with the communications device, wherein the connectivity utility determines if a connection is available using a first method in a pre-activation state and using a second method in a post-activation state.

17. The system of claim 16 wherein the connectivity utility displays to a user at least one of service status information, connection information, parameter control information, event information, error recovery information, auto-diagnosis information, billing information, or help desk information.

18. The system of claim 16 wherein the first device comprises a computer, the communications device is connected to the computer, and the connectivity utility comprises a software application on the computer.

19. The system of claim 18 wherein the communications device is internally connected to the computer.

20. The system of claim 18 wherein the communications device is externally connected to the computer.

21. The system of claim 16 wherein the analog connection is a dial-up connection.

22. The system of claim 16 wherein the digital connection is a Cable connection, DSL connection, Satellite connection, ISDN connection, T1 connection, T3 connection, or wireless connection.

23. The system of claim 16 wherein the first and second methods comprise one of the following methods:
   checking for the availability of a connection at timed intervals;
   checking for the availability of a connection constantly;
   checking for the availability of a connection based on a user indication; or
   checking for the availability of a connection based on an indication from a source other than the user.

24. The system of claim 16 wherein the connectivity utility communicates with at least one server computer through the communications device.

25. The system of claim 16 wherein the connectivity utility sends or receives at least one of service status information, connection information, parameter control information, event information, error recovery information, auto-diagnosis information, billing information, or help desk information.

26. A system for connecting a first device to a second device comprising:
   a means for establishing and maintaining a dial-up connection;
   a means for establishing and maintaining a DSL connection; and
   a means for interacting with a software device that provides notifications to the first or second device related to changes in a connection status.

27. The system of claim 26 further comprising a connectivity utility that communicates with at least one server computer using the dial-up connection or DSL connection.

28. The system of claim 27 wherein the connectivity utility sends or receives at least one of service status information, connection information, parameter control information, event information, error recovery information, auto-diagnosis information, billing information, or help desk information.

29. The system of claim 27 wherein the connectivity utility displays to a user at least one of service status information, connection information, parameter control information, event information, error recovery information, auto-diagnosis information, billing information, or help desk information.

30. The system of claim 26 further comprising a means for sensing if a connection is available.

31. The system of 30 further comprising determining when to sense the availability of a connection by one of the following methods:
   checking for the availability of a connection at timed intervals;
   checking for the availability of a connection constantly;
   checking for the availability of a connection based on a user indication; or
   checking for the availability of a connection based on an indication from a source other than the user.

32. The system of claim 31 wherein a user determines the method of determining when to sense the availability of a connection.

33. The system of claim 30 wherein sensing the availability of a connection comprises detecting a carrier or dial tone, or sending and receiving a test message.

34. A computer-readable storage medium containing computer-executable instructions for implementing a connectivity utility program for communicating with a first modem, the first modem in communication with a server computer, wherein the connectivity utility; is configured to: provide to a computing device notifications related to changes in a connection status; and
   obtain from the server computer service status information, the service status information comprising at least one of the following:
      an approximate time for when a phone company is scheduled to enable a user's line for a DSL connection;
      an approximate time for when a DSL connection is scheduled to be available;
      whether a second modem has been dispatched to the user;
      an approximate time a dispatched modem is scheduled to arrive; or
      an approximate time for when a DSL service will be available after an interruption in service.

35. The computer-readable storage medium of claim 34 wherein the connectivity utility program also communicates with the server computer through the first or second modem to obtain connection state information, wherein the connection state information comprises at least one of the following:
   whether a connection is established;
   a type of connection that is currently established;
   a speed of a currently established connection; or
   a length of time a connection has been established.

36. The computer-readable storage medium of claim 34 wherein the connectivity utility program also communicates with the server computer through the first or second modem to obtain auto-diagnosis information, wherein the auto-diagnosis information comprises at least one of the following:
   information indicative of a problem encountered during use of the first or second modem;
   predefined parameter settings to fix a problem encountered during use of the first or second modem; or
   information to allow a help technician to analyze a problem encountered during use of the modem.

37. The computer-readable storage medium of claim 34 wherein the connectivity utility program also communicates with the server computer through the first or second modem to obtain help desk information, wherein help desk information comprises at least one of the following:
   an indication that a user is having difficulty with the first or second modem;
   contact information for the user;
   text information describing a problem encountered during use of the first or second modem;
   instructions for a method to solve a problem encountered during use of the first or second modem;
   text information containing "Frequently Asked Questions";
   a searchable database; or
   a hyperlink to a URL with help desk information.

38. The computer-readable storage medium of claim 34 wherein the connectivity utility program also communicates with the server computer through the first or second modem to obtain parameter control information, wherein parameter control information comprises at least one of the following:
   whether to notify the user before switching connection types;
   whether to notify the user before disconnecting a connection;
   whether to automatically connect when an application prompts for a connection; or
   whether to allow the user to select dial-up access numbers or to have them selected automatically.

39. The computer-readable storage medium of claim 34 wherein the connectivity utility program also communicates with the server computer through the first or second modem to obtain event logging information, wherein event logging information comprises at least one of the following:
   a time when a connection was established or discontinued;
   a cause associated with a connection being established or discontinued;
   a sequence of individual modem commands
   an occurrence of an individual modem command; or
   a log of data transmitted through the first or second modem.

40. The computer-readable storage medium of claim 34 wherein the connectivity utility program also communicates with the server computer through the first or second modem to obtain error recovery information, wherein error recovery information comprises at least one of the following:
   a type of connection that was previously established;
   a particular web page a user was previously viewing; or
   a particular application that was previously executing.

41. The computer-readable storage medium of claim 34 wherein the connectivity utility program also communicates with the server computer through the first or second modem to obtain billing information, wherein billing information comprises at least one of the following:
   an amount a user is being charged for service;
   an amount owed by a user to a Service Provider;
   a hyperlink to a URL where instructions can be found on how to make a payment;
   a hyperlink to a URL where payment may be made electronically; or
   an indication of whether a payment has been received.

42. The computer-readable storage medium of claim 34 wherein the second modem is operable to establish and maintain a dial-up connection and a broadband connection.

43. A method for providing internet access to a computing device, the method comprising:
   supplying a modem and a connectivity utility program;

wherein the modem is operable to establish and maintain a dial-up connection and a broadband connection, and wherein the utility program provides notifications to the computing device related to changes in connection status.

44. The method of claim 43 wherein when a broadband connection is in a first state:
the modem establishes a dial-up connection when the computing device indicates a connection is desired;
the modem checks for the availability of the broadband connection;
and the connectivity utility provides the computing device with an estimate of when the broadband connection is expected to be available.

45. The method of claim 43 wherein when a broadband connection is in a second state:
the modem establishes the broadband connection when the computing device indicates a connection is desired;
the modem establishes a dial-up connection when an interruption in broadband service occurs; and
the connectivity utility notifies the computing device when the broadband connection is available again after the interruption.

46. The method of claim 44 wherein the first state is prior to a DSL line being enabled.

47. The method of claim 45 wherein the second state is subsequent to a DSL line being enabled.

48. The method of claim 43 wherein the connectivity utility provides at least one of a service status function, connection information function, parameter control function, event function, error recovery function, auto-diagnosis function, billing information function, or help desk function.

* * * * *

UNITED STATES PATENT AND TRADEMARK OFFICE
CERTIFICATE OF CORRECTION

| | | |
|---|---|---|
| PATENT NO. | : 7,023,973 B2 | Page 1 of 1 |
| APPLICATION NO. | : 10/425066 | |
| DATED | : April 4, 2006 | |
| INVENTOR(S) | : Vinay Gupta | |

It is certified that error appears in the above-identified patent and that said Letters Patent is hereby corrected as shown below:

On the title page, item (56), under "U.S. Patent Documents", in column 2, line 2, after "6,750,879" delete "B1" and insert -- B2 --, therefor.

In column 11, line 9, in Claim 31, after "The system of" insert -- claim --.

In column 11, line 29, in Claim 34, after "utility" delete ";".

In column 12, line 37, in Claim 39, after "commands" insert -- ; --.

Signed and Sealed this

Twenty-third Day of March, 2010

David J. Kappos
*Director of the United States Patent and Trademark Office*